United States Patent [19]

Tognazzini

[11] Patent Number: 5,787,385
[45] Date of Patent: Jul. 28, 1998

[54] COMPUTER CONTROLLED LASER FOG TRACKING

[75] Inventor: Bruce Tognazzini, Woodside, Calif.

[73] Assignee: Sun Microsystems, Inc., Palo Alto, Calif.

[21] Appl. No.: 608,456

[22] Filed: Feb. 28, 1996

[51] Int. Cl.$^6$ .................. G06F 163/00; G06F 169/00
[52] U.S. Cl. ............................................... 702/3
[58] Field of Search ........................ 364/420; 404/14; 73/655, 656, 657; 239/2.1, 14.1; 454/901

[56] References Cited

U.S. PATENT DOCUMENTS

| | | |
|---|---|---|
| 3,528,740 | 9/1970 | Gerry . |
| 3,772,525 | 11/1973 | Goodwin ............................ 250/575 |
| 3,850,529 | 11/1974 | Brugger . |
| 3,917,957 | 11/1975 | Ansevin . |
| 3,952,950 | 4/1976 | Pocrnja et al. ....................... 239/14.1 |
| 3,973,852 | 8/1976 | Moore et al. . |
| 3,994,601 | 11/1976 | Brugger . |
| 3,997,271 | 12/1976 | Brugger . |
| 4,001,595 | 1/1977 | Reisman . |
| 4,229,653 | 10/1980 | Uthe . |
| 4,419,731 | 12/1983 | Puffett . |
| 4,469,443 | 9/1984 | Geller . |
| 4,640,621 | 2/1987 | Rose . |
| 4,937,461 | 6/1990 | Traina . |
| 5,028,790 | 7/1991 | Ketchum et al. . |
| 5,077,480 | 12/1991 | Traina .............................. 250/575 |
| 5,298,750 | 3/1994 | Rericha ............................. 250/353 |
| 5,345,243 | 9/1994 | Levis . |
| 5,404,228 | 4/1995 | McGowan .......................... 250/573 |
| 5,444,530 | 8/1995 | Wang ............................... 250/573 |
| 5,592,157 | 1/1997 | Metz et al. ......................... 340/905 |

OTHER PUBLICATIONS

Frederic M. Zweibaum et al, "Applying a microprocessor-controlled spectral radiometer system to field measurements", SPIE vol. 230, Minicomputers and Microprocessors in Optical Systems (1980), pp. 25–36.

Fawwaz T. Ulaby et al, "Remote Sensing Techniques", Encyclopedia of Physical Science and Technology, Second Edition, vol. 14, 1992, pp. 475–484.

Glossary of Meteorology, American Meteorological Society, pp. 590 and 215 (1959).

Ronald R. Gruenzel et al, "Design and Implementation of a broadband infrared atmospheric transmissometer", SPIE vol. 277 Atmospheric Transmission, 1981, pp. 168–173.

Donald A. Leonard et al, "A Single–ended Atmospheric Transmissometer", Optical Engineering—Jan./Feb. 1994, vol. 13, No. 1, pp. 10–14.

G.M. Hidy, "Aerosols", Encyclopedia of Physical Science and Technology, vol. 1, 1992, pp. 318–339.

Hirschman, PTO Defense Publication No. H1066, entitled "Airborne Infrared Transmissometer", dated Jun. 2, 1992, Abstract Only.

*Primary Examiner*—Donald E. McElheny, Jr.
*Attorney, Agent, or Firm*—McDermott, Will & Emery

[57] ABSTRACT

A scanning transmissometer is disclosed for use with a large number of reflectors for detecting dense, but very localized patches of fog to permit warnings to be given to drivers in time to avoid accidents. Reflectors utilized to reflect the laser beam from a scanning transmissometer are heated to remove condensation before measurements of transmissivity are taken. In some implementations, heaters for reflectors are initiated upon detection of a prescan illumination of the reflector by a laser beam and a timer is utilized to turn off heating, once condensation has been dispersed.

22 Claims, 19 Drawing Sheets

LOOK UP TABLE

| AZIMUTH | ELEVATION | REFLECTOR NO. | TRANSMISSIVITY |
|---|---|---|---|
| 28.20 | -4.30 | 1 | .98 |
| 35.17 | -5.21 | 2 | .85 |
| 42.6 | -3.21 | 3 | .32 |
| ... | ... | ... | ... |

1200 → AZIMUTH
1210 → ELEVATION
1215 → REFLECTOR NO.
1220 → TRANSMISSIVITY

Figure 12

COMPUTER CONTROLLED LASER FOG TRACKING

BACKGROUND OF THE INVENTION

1. Field of the Invention

This invention relates generally to detecting environmental conditions, such as fog, and more particularly to a computer controlled scanning transmissometer for detecting environmental conditions at a number of relatively closely spaced points along a highway.

2. Description of Related Art

Devices for detecting the presence of particulate matter, such as that emitted from smokestacks or for detecting reduced visibility due to weather conditions, are known. Such devices are known as transmissometers and typically include a light source, such as a laser, and a detector for detecting either light from the light source directly or light from the light source reflected back to the detector from a reflector such as a mirror. Transmissometers operate by detecting a reduction in the intensity of the light which results from the introduction of particulate matter or intervening weather conditions such as fog.

Transmissometers are known in the prior art. For example, U.S. Pat. No. 3,973,852 which issued Aug. 10, 1976 to Goode et al. discloses a portable apparatus for measuring particulate concentration in the atmosphere by using monochromatic laser pulses positioned in transparent atmospheric windows. The transmissometer of Goode et al. is utilized to detect particulates such as smoke, fog, smog, dust and the like.

U.S. Pat. No. 5,404,228 which issued Apr. 4, 1995 to McGowan utilizes a transmissometer including a transceiver mounted on one side of a smoke stack and a reflector unit mounted on the other side of the smoke stack. A beam of light is directed from a light source across the smoke stack to the reflector and is reflected back across the smoke stack to the transceiver to measure the opacity level of smoke in the smokestack. The reflector unit is circular and has a diameter that is greater than that of the columnated light so that the reflector is underfilled.

U.S. Pat. No. 4,419,731 which issued Dec. 6, 1983 to Puffett includes apparatus for estimating the slant visibility in fog using a transmissometer array aligned to take visibility readings over a slanted distance from different heights not far from a runway and a computer is arranged to compare the readings obtained from the transmissometers with a plurality of fog profile models to determine "the definitive model" and therefore to derive a visual acquisition estimate.

The article "Applying a Microprocessor-Controlled Spectral Radiometer System to Field Measurements" by Zweibaum et al. (SPIE Vol. 230, Minicomputers and Microprocessors in Optical Systems (1980)) discusses microprocessor control of certain data and switching functions and a radiometer which can be applied to transmissometer uses.

The article "A Single-Ended Atmospheric Transmissometer" by Leonard et al. (Optical Engineering January/February 1974) discusses the determination of transmissivity without using a reflector, by using the Raman shifted component of laser back scatter from atmospheric nitrogen.

3. Problems of the Prior Art

The class of problems solved by this invention has its genesis in a large number of multi-vehicle automobile accidents that occur in areas, such as the Central Valley of California, in which small but very dense pockets of fog are encountered suddenly and without warning by vehicles travelling in an otherwise clear area. Because these pockets are so localized, they are difficult to detect. Further, because the pockets of fog are so small, a large number of transmissometers would need to be deployed at very close intervals to ensure that a pocket of fog was not missed. Such a close deployment of transmissometers would drive the cost of a fog detection system dramatically upward to the point of infeasibility. Further, maintenance costs would be proportionately increased. Positioning the transmissometers at greater distances would result in a failure to detect very localized fog conditions and in a lack of confidence in the warning system which might cause the driving public to ignore a real threat.

Another problem arises from utilizing transmissometers to detect fog. Condensation on reflecting components, such as mirrors, will yield false readings and incorrect warnings as with their attendant difficulties.

SUMMARY OF THE INVENTION

The present invention overcomes the problems of the prior art by providing methods, apparatus and computer program products to detect localized fog with high reliability and with greatly reduced costs over the prior art. The invention achieves this by providing a scanning transmissometer or a transmissometer with a scanning laser and using that transmissometer to illuminate a plurality of reflectors positioned on poles along a highway. Attenuation experienced over the path from the scanning laser to the reflector and then to the detector is utilized as an indication of the presence of fog or other conditions of impaired visibility.

Additional reliability is achieved in accordance with the invention by providing redundant pairs of scanning transmissometers on opposite sides of a highway operating in an interlaced manner for mutual validation of results. Adjacent scanning transmissometers located on the same side of a highway can be utilized in an overlapped and interleaved fashion for yet additional reliability.

In accordance with the invention, a plurality of techniques are directed to the problem of defogging mirrors utilized in the measurement of transmissivity. In one embodiment, portions of a mirror's surface are blackened and the blackened sections utilized to absorb radiation from the scanning transmissometer, thus heating the mirror. In another embodiment, a mirror is mounted on a portion of a blackened sheet of metal, such as anodized aluminum, and the other portion of the metal sheet is utilized as a target for providing heating radiation to the mirror assembly. In yet another embodiment, mirrors are equipped with built in heaters with associated timers which are activated by a laser prescan of the mirrors to remove any condensation. In another embodiment, the mirrors mounted on the section of heat pipes at one end and the other end of the heat pipes is illuminated with radiant energy to cause boiling of the fluid within the heat pipes and warming of the mirror. Infrared lasers, may, of course, be utilized as a heat source for warming the mirrors using any of these embodiments.

A system for detecting a reduction in visibility is disclosed which includes a plurality of reflectors and at least one scanning transmissometer for illuminating said reflectors and detecting reflected illumination. Reflectors can be positioned in a number of different configurations such that reflectors scanned by one transmissometer are interleaved with those scanned by a different transmissometer.

A number of techniques are disclosed by which reflectors can be heated to eliminate condensation which might otherwise interfere with transmissivity measurements. Generally these include providing radiation absorbing surfaces which help heat the reflector when irradiated, e.g. by the transmissometer during a pre-scan (i.e. pre-measurement scan). In one approach, a prescan of the reflector by the transmissometer is detected and used to activate a heater for a time sufficient to dispel condensation.

Also disclosed is a method of determining the precise location of reflectors. This is done by determining boundaries beyond which a search for a reflector should not go and directing the transmissometer to the center of the search boundaries. The transmissometer is then activated and directed through a coarse search pattern. When a reflection is detected, scanning stops. A fine scan in the immediate vicinity of the location at which scanning stopped is optionally undertaken to locate the precise azimuth and elevation of the transmissometer which results in the strongest reflection. Azimuth and elevation may be stored in a look up table.

Also disclosed is a method of scanning reflectors with a scanning transmissometer, using entries of azimuth and elevation for each reflector stored in a look up table. Table entries are read in a sequence and the transmissometer directed to the azimuth and elevation contained in the table entries in the order in which the entries are read.

Also disclosed is a computer program product in the form of a computer program stored on a memory medium. The computer program carries out the steps necessary to using the scanning transmissometers for detecting a reduction in visibility in the path between the transmissometer and the detector.

Also disclosed are a method and computer program product containing a program for carrying out a method of aligning reflectors for use with scanning transmissometers. The method involves controlling the transmissometer to scan an area near a reflector until a reflection is acquired and then sending control signals to a receiver connected to alignment servos of a reflector to control its position to seek an increased intensity in reflected light at the scanning transmissometers. The receiver is disconnectable from the alignment servos once the reflector is aligned and then carried to the next reflector, where it is used for aligning that reflector.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive. dr

DESCRIPTION OF DRAWINGS

The objects, features and advantages of the invention will be apparent from the following description in which:

FIG. 12 illustrates a look up table utilized to store information about reflector location and utilized to drive the computerized scanning of reflectors positioned along a highway.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art. A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1:
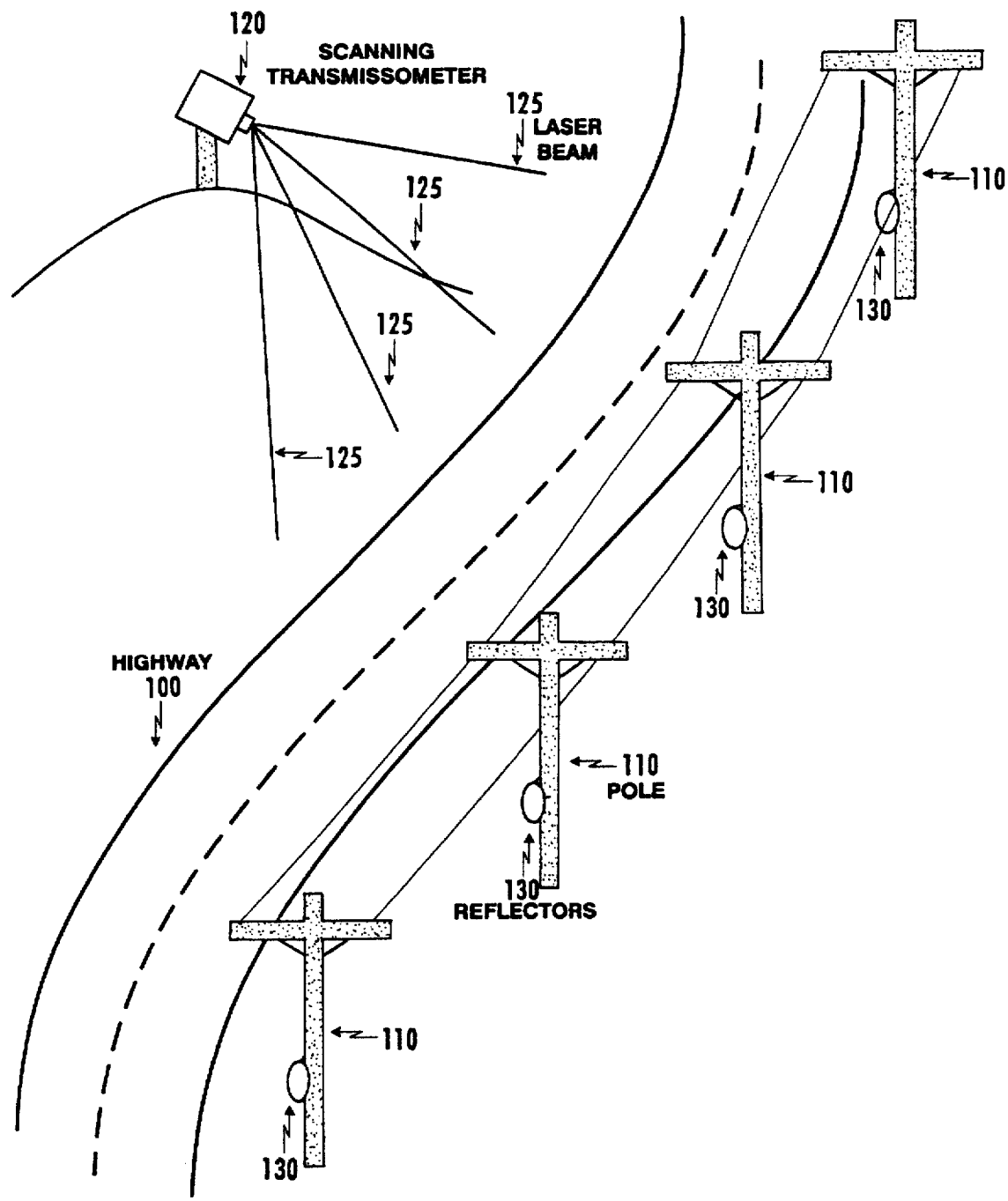
FIG. 1 illustrates a scanning transmissometer utilized for detecting fog along a section of highway in accordance with the invention.

FIG. 1 illustrates a scanning transmissometer utilized for detecting fog along a section of highway in accordance with the invention. Highway 100 is located in an area known to be subject to dense concentration of highly localized fog. A scanning transmissometer 120 is located at an elevation from which a large stretch of road can be observed. A large number of reflectors 130 are mounted on poles 110 closely adjacent to the roadway. The reflectors can be mounted on utility poles as illustrated or may be mounted on their own individualized poles.

In operation, scanning transmissometer 120 directs a laser beam 125 at mirrors 130 in a sequential fashion. The detector on the transmissometer then determines the amount of attenuation experienced over the path from the scanning transmissometer 120 to the mirror 130 and back.

Figure 2:
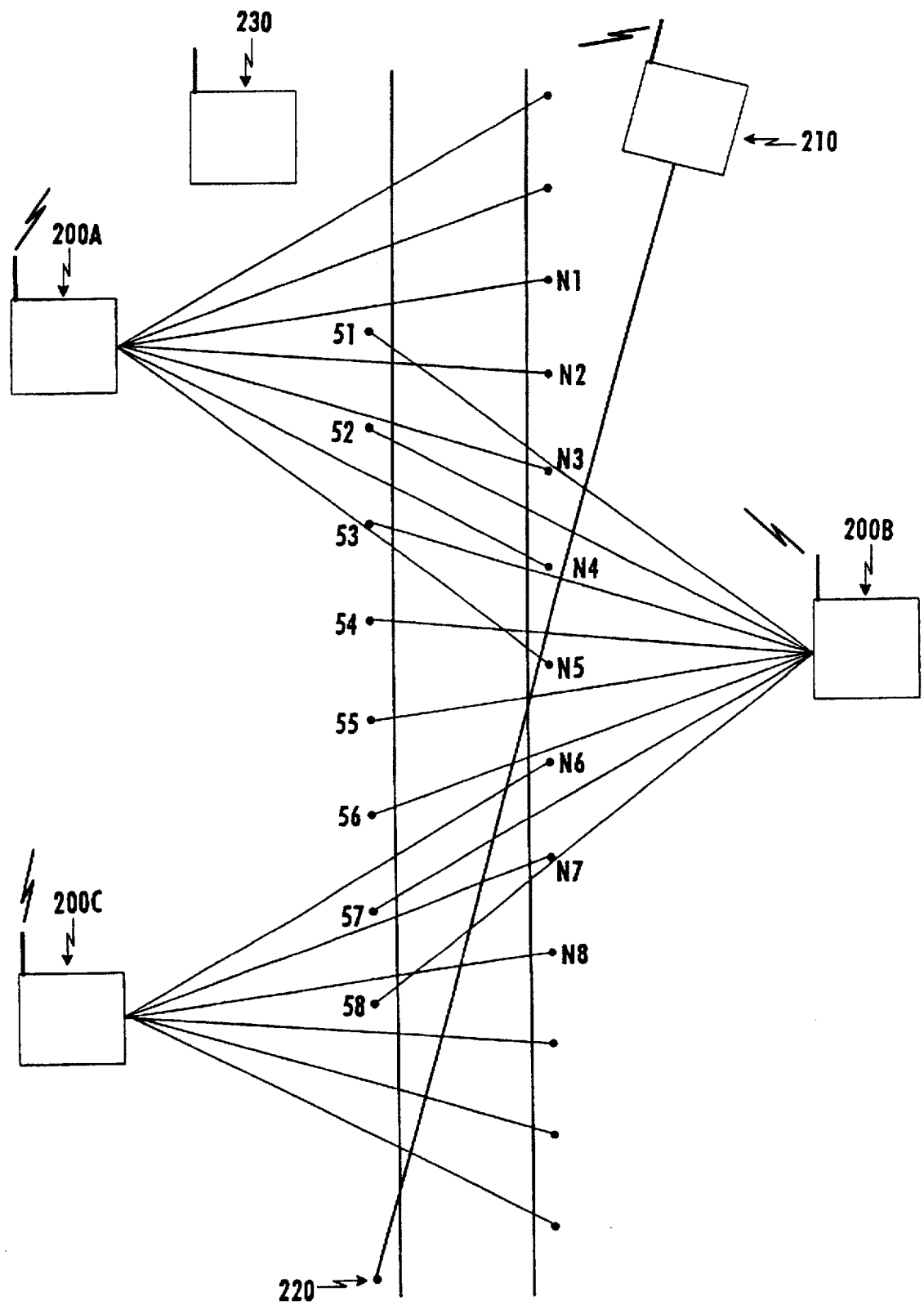
FIG. 2 illustrates a plurality of scanning transmissometers with associated reflectors arranged in a redundant overlapping, interlaced configuration.

FIG. 2 illustrates a plurality of scanning transmissometers 200A, 200B and 200C with associated reflectors arranged in a redundant overlapping, interlaced configuration.

Each scanning transmissometer scans its set of reflector/detector stations, e.g. S1–S8 in FIG. 2, and reports the detected transmissometer reading to the central computer. The use of scanning transmissometers and simple passive reflectors results in a very cost effective implementation. Instead of large numbers of transmissometers, only large numbers of reflectors are required.

Because of the economical nature of the implementations disclosed herein, one can easily afford an additional level of redundance. This additional level of redundance is illustrated in FIG. 2 in which a fixed transmissometer 210 is designed to provide a sensing path which extends over a much greater length than the normal transmissometer detector pair paths and over a path which is much more nearly parallel to the path of an extended stretch of road than that utilized by the scanning transmissometers. Thus, if the road is reasonably straight for 8 or 10 miles, a fixed transmissometer could be aligned to almost parallel the road, finally crossing the road at a reflector or detector point many miles away. Such a configuration might be useful for detecting certain types of system failures which might otherwise not be detected. For example, if fog were encroaching on one side of the road only, in such a way that both scanning reflectometers 200A and 200C were obscured, and some of the detectors S1–S8 of scanning reflectometer 200B were obscured, the road might nevertheless be clear. Under these circumstances, fixed transmissometer 210 would illuminate detector 220 indicating a clear road, notwithstanding a very strong indication from the scanning reflectometers that the road is obscured with fog.

Each of scanning transmissometers 200A–200C illustrated communicate with a centralized traffic computer 230 over a communications link, such as a slotted aloha radio link.

Figure 3:
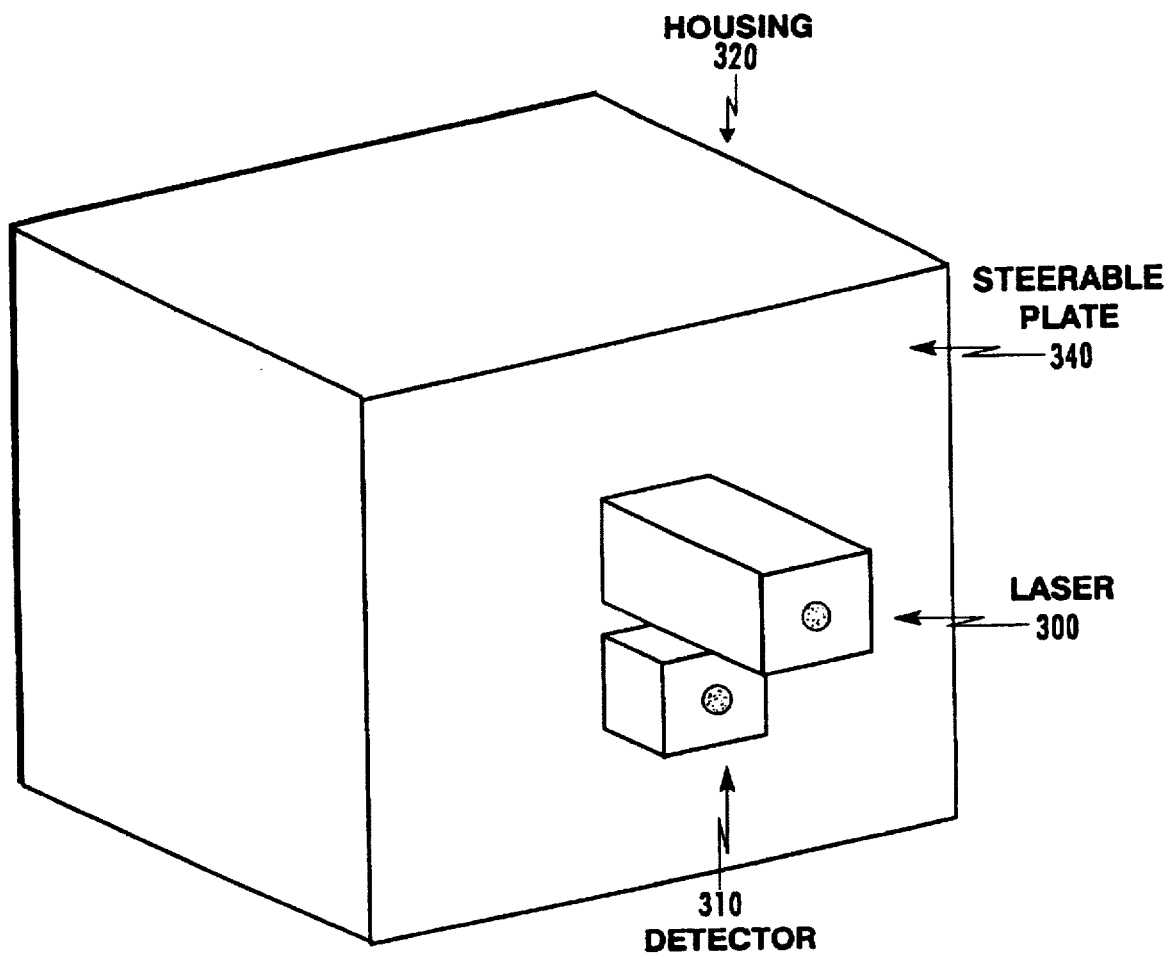
FIG. 3 illustrates one form of scanning transmissometer.
Figure 4A:
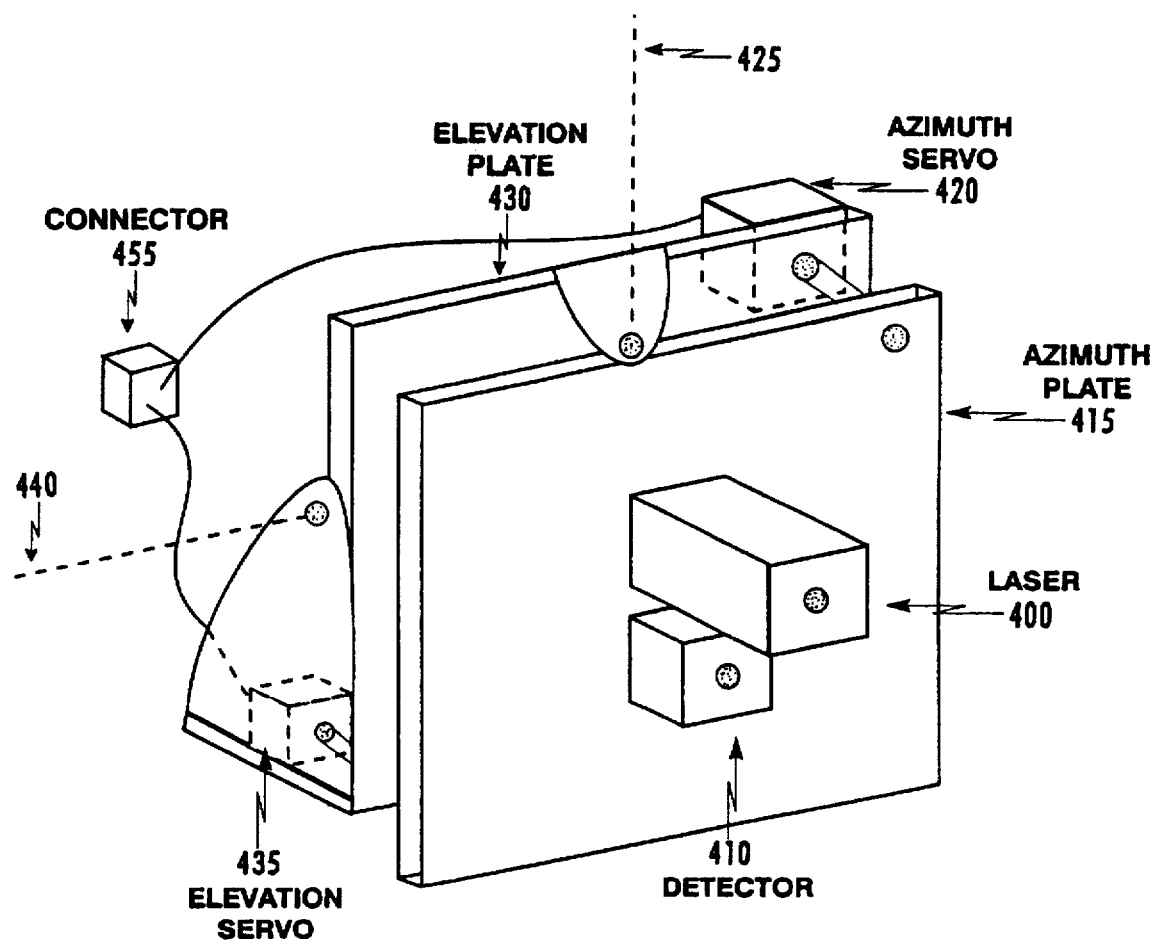
FIG. 4A illustrates the details of the scanning transmissometer of FIG. 3.
Figure 4B:
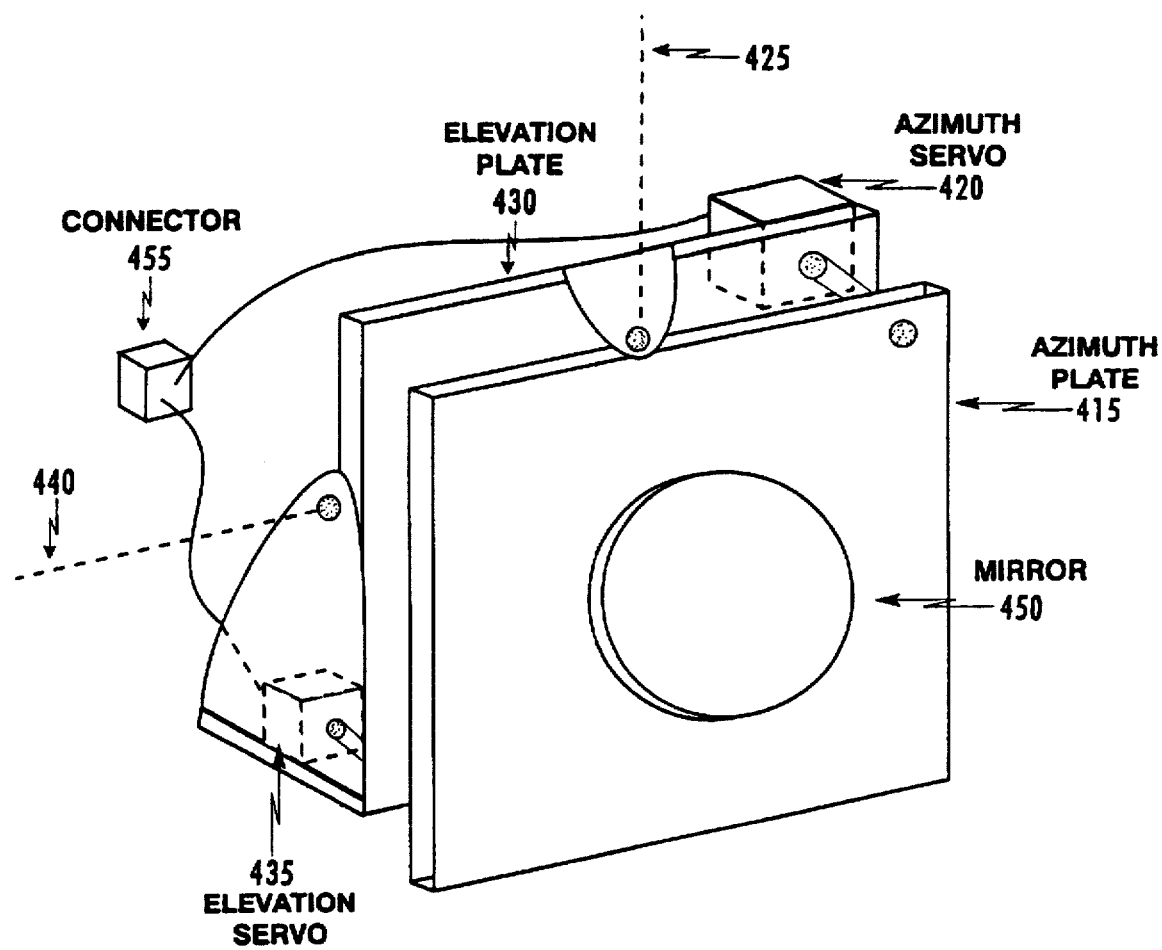
FIG. 4B illustrates the details of a reflector which can be adjusted in azimuth and elevation using alignment servos.
Figure 4C:
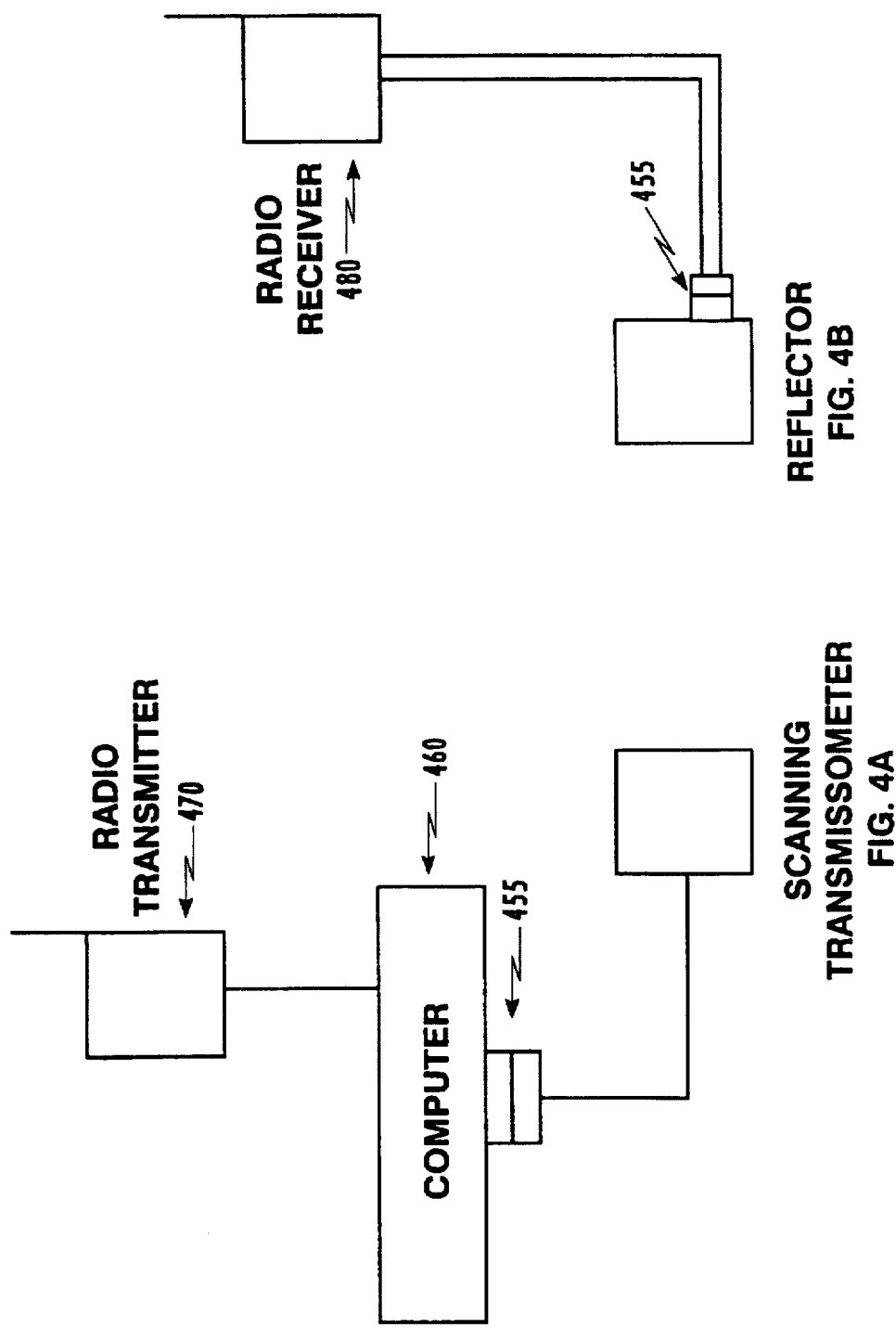
FIG. 4C illustrates the link between a computer controlling the scanning transmissometer and a receiver for aligning an adjustable reflector of the type shown in FIG. 4B.
Figure 4D:
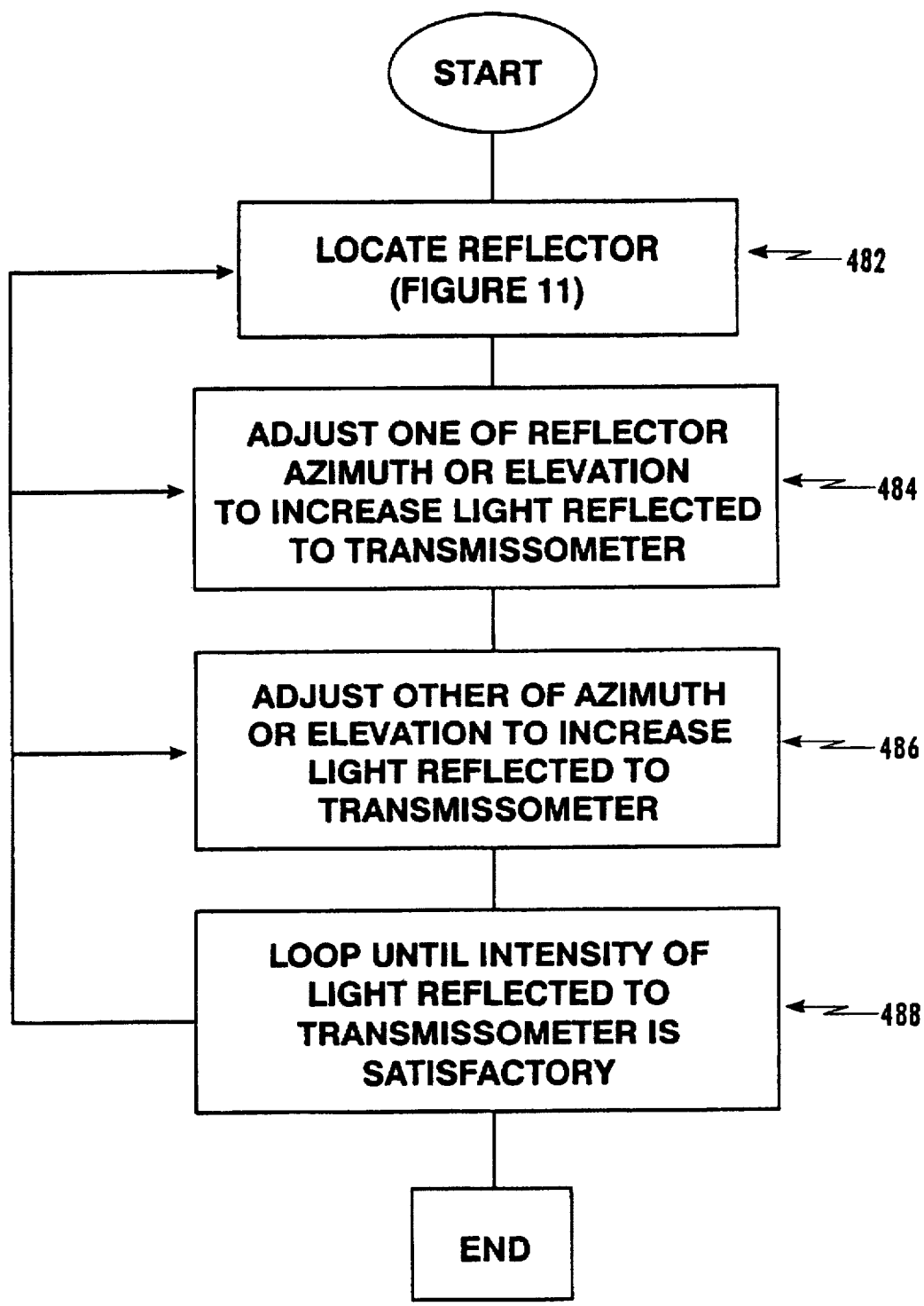
FIG. 4D is a flow chart of a process for aligning reflectors to optimize the light reflected to transmissometers from reflectors.

FIG. 3 illustrates one form of scanning transmissometer. A laser 300 and a detector 310 are mounted on a steerable plate 340 which can rotate in the azimuthal and elevational directions.

FIG. 4 illustrates the details of the scanning transmissometer of FIG. 3. Laser 400 and detector 410 are mounted on an azimuth plate 415 which can rotate about center line 425 to scan the laser and the detector in the azimuthal direction. An azimuth servo 420 is mounted to control the amount of rotation about the center line 425 and is arranged to allow for extremely precision positioning of the azimuthal plate 415. Typically, this is done utilizing a threaded drive shaft having very high number of threads per inch. The azimuth plate assembly is mounted on elevational plate 430. Elevation plate 430 is designed to rotate about axis 440. It is controlled by an elevation servo 435 in the same manner as described above. Thus, by activating servos 420 and 435, the position of the laser 400 and detector 410 may be finely controlled and dynamically scanned in both the azimuthal and elevational directions.

Figure 5:
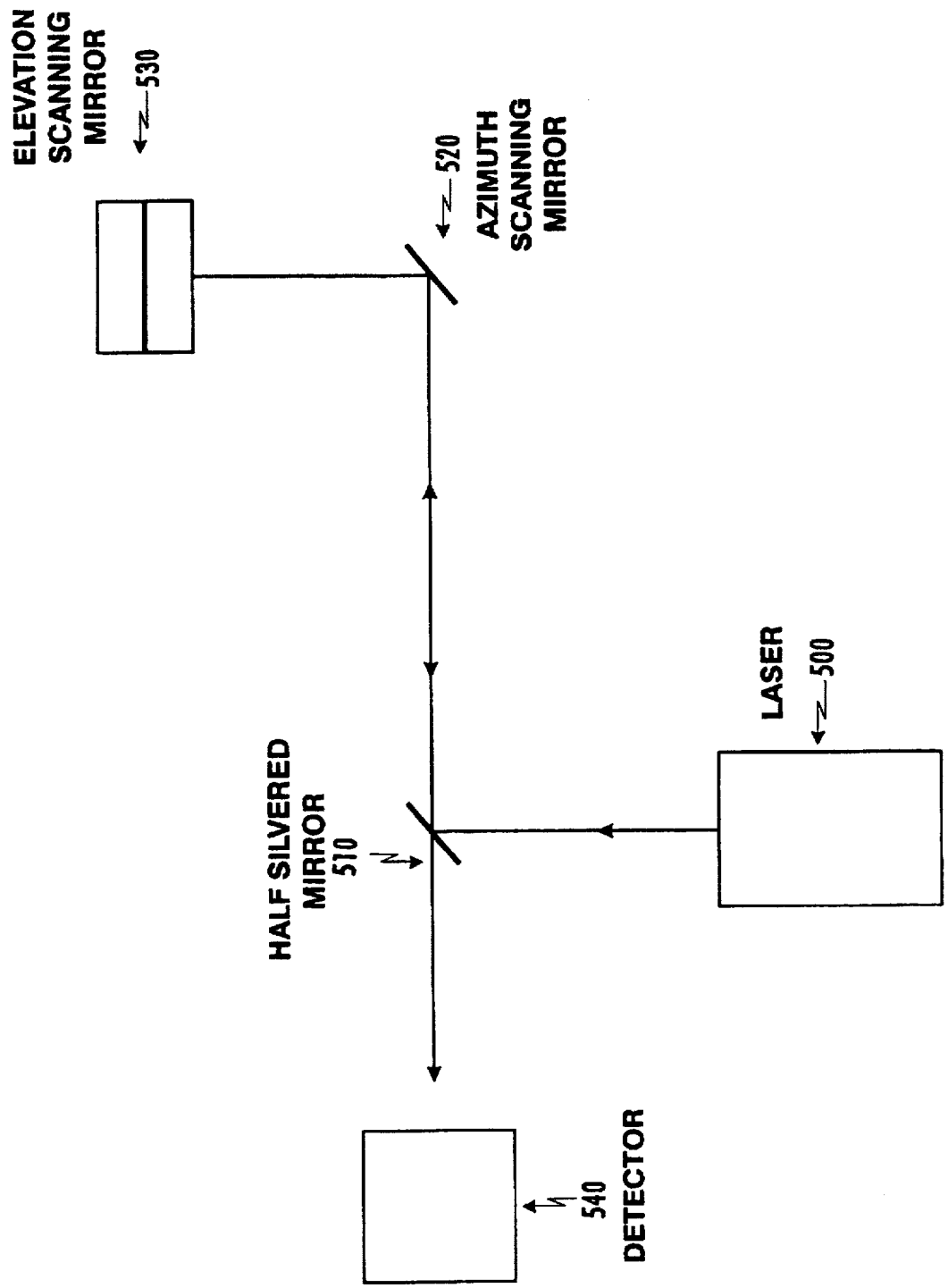
FIG. 5 illustrates a scanning laser transmissometer in which the laser beam is deflected by scanning mirrors.

FIG. 5 illustrates a scanning laser transmissometer in which the laser beam is deflected by scanning mirrors. FIG. 5 represents a preferred arrangement for scanning the roadside reflectors. Both laser 500 and detector 540 are mounted in a fixed position. Only scanning mirrors 520 and 530 are rotated. This allows less inertial mass and a quicker positioning of the laser beam. In operation, laser 500 emits a laser beam toward half-silvered mirror 510 where a portion of the beam is deflected toward azimuth scanning mirror 520. Control of the rotation of azimuth scanning mirror 520 about its axis results in deflection of the laser beam as it moves towards elevation scanning mirror 530. The deflection of azimuth scanning mirror 520 determines the amount of beam shift left or right whereas the amount of rotation of elevation scanning mirror 530 determines the amount of deflection of the laser beam in an up and down direction. Thus, the beam can be controlled so as to accurately target each of the reflectors along a stretch of road within the viewing window of the scanner. When the laser beam from laser 500 bounces off a roadside reflector and returns, it returns to the same mirrors by which it was deflected, namely mirrors 520 and 530 and returns to half-silvered mirror 510 where the returning beam passes through the half-silvered mirror to detector 540.

Figure 6:
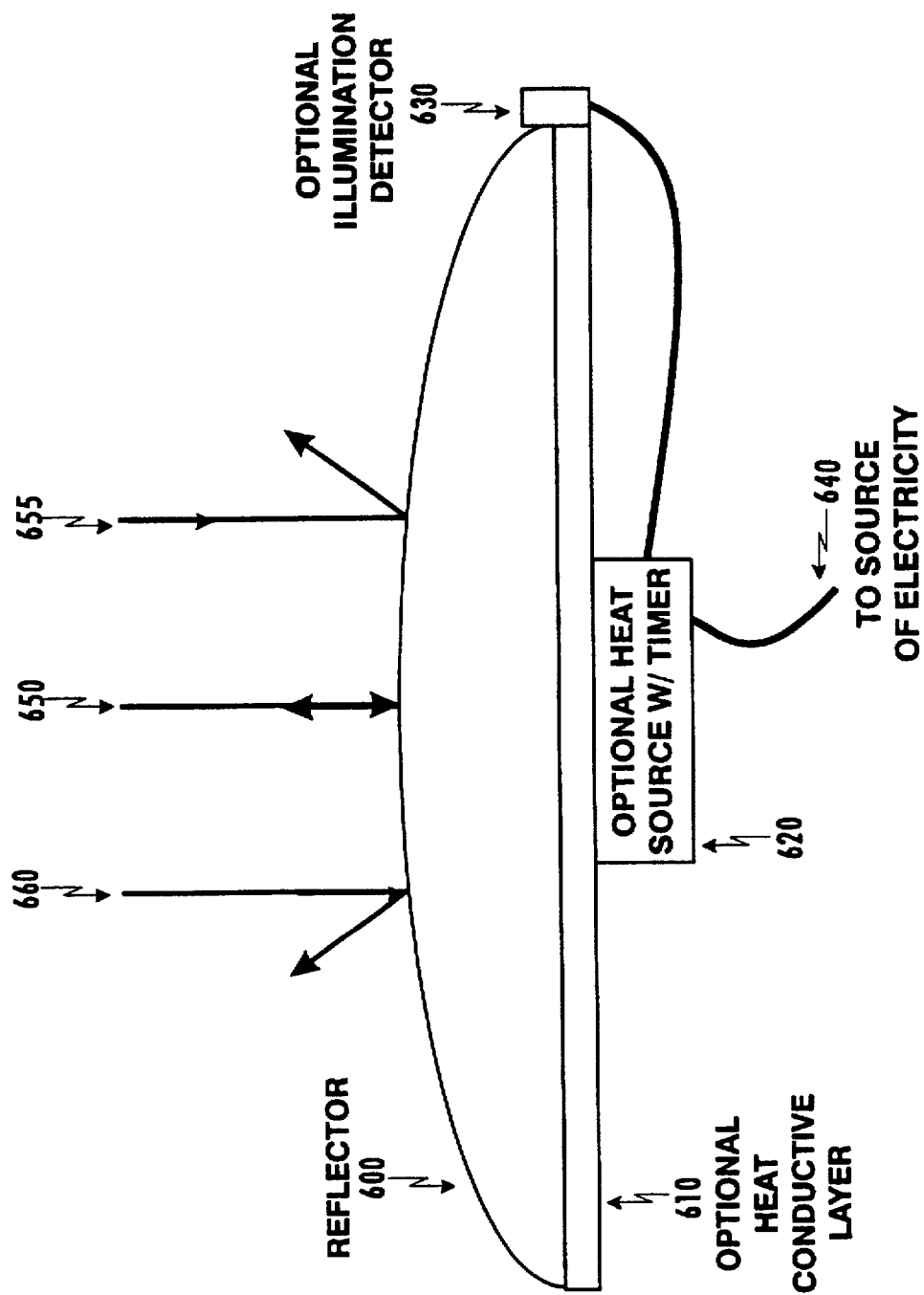
FIG. 6 illustrates a slightly convex reflecting mirror with heater and timer.

FIG. 6 illustrates a slightly convex reflecting mirror with heater and timer. The reflector shown in FIG. 6 is slightly concave which permits a slight amount of beam spreading upon reflection. This is illustrated by the fact that ray 650, through the optical center of the reflector is reflected back directly whereas rays 655 and 660 which are slightly displaced from the center are reflected with angles slightly off center from the return ray 650. The mirror could be flat, however, it is sometimes desirable to spread the laser beam slightly to minimize alignment problems between the detector and the reflector. If adequate optical signal strength is available, the ease of alignment is more than worth the slight attenuation in signal level resulting from beam spreading.

The mirror of FIG. 6 shows an optional heat conductive layer 610, an optional heat source with timer 620 and an optional illumination detector 630. The optional configuration permits selective activation of reflector defogging.

In operation, a prescan illumination of each roadside detector occurs prior to taking data. Illumination detector 630 detects this prescan illumination and activates a timer in 620 which permits electricity from a source of electricity 640 to be applied to a heating source 620 for warming the mirror. Heat transfer between the heat source 620 and the mirrors facilitated by heat conductive layer 610. After the appropriate amount of time specified by the timer has passed, electricity to the heating element is automatically turned off until the next prescan. After the mirrors have had sufficient time to warm and rid themselves of any condensation, the actual data scan of the roadside reflectors is undertaken. At the time of the data scan, each of the reflectors should be free of any condensation.

Figure 7B:
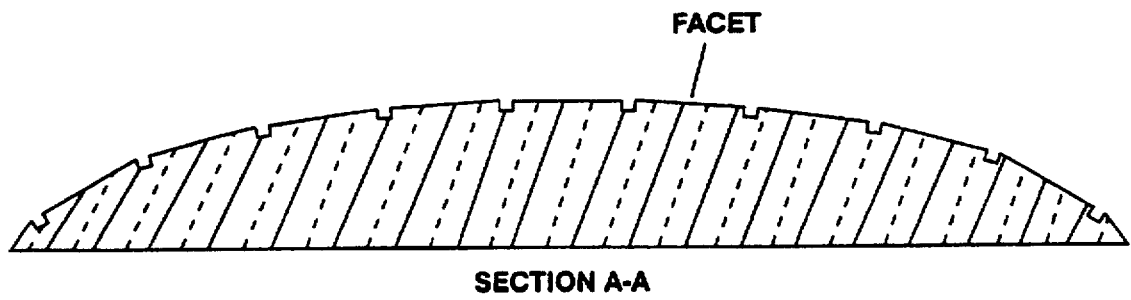
FIG. 7B shows a section of the mirror of FIG. 7A taken along section A—A.
Figure 7A:
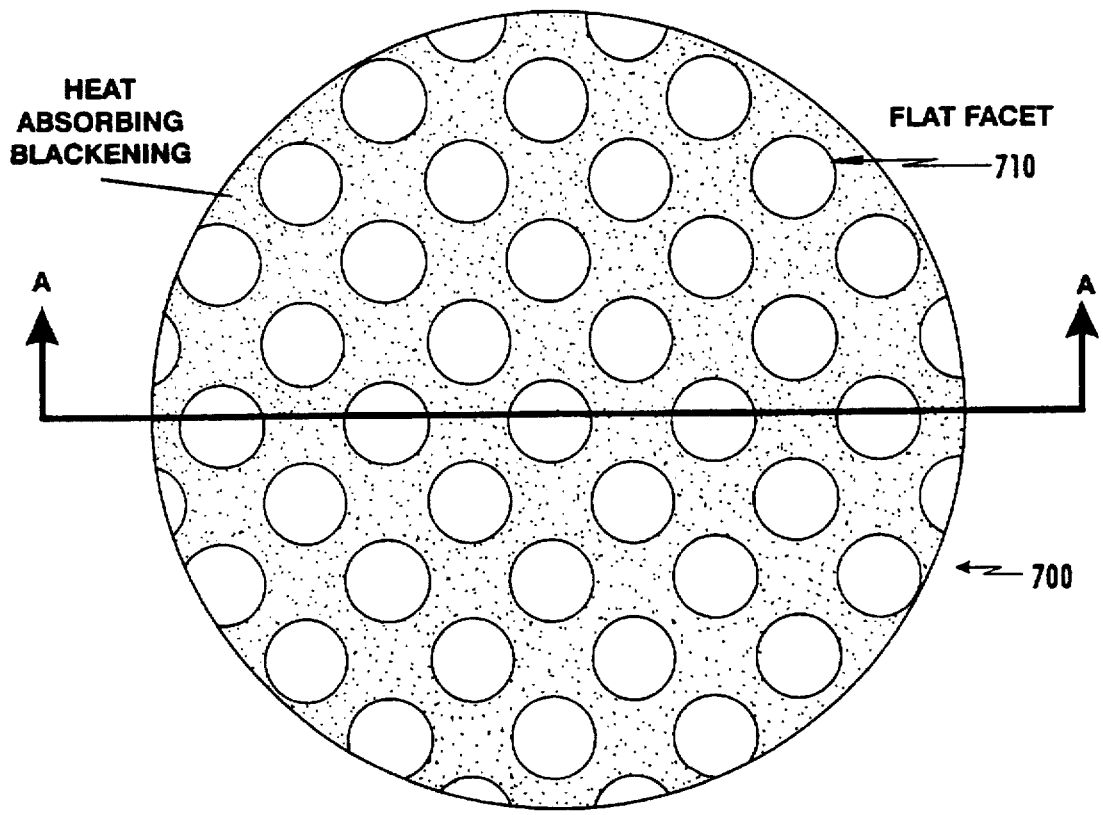
FIG. 7A illustrates a slightly convex mirror with a plurality of flat facets formed in the surface.

FIG. 7A illustrates a slightly convex mirror with a plurality of flat facets formed in the surface.

FIG. 7B shows a section of the mirror of FIG. 7A taken along section A—A.

The reflector of FIGS. 7A and 7B is also slightly convex but has a plurality of flat highly reflective facets formed in the surface of the reflector. The portions of the reflector other than the facets, are intentionally blackened to facilitate absorption of radiation. When using this reflector, the reflector is heated by allowing the laser beam to illuminate the surface and energy from the laser beam to be absorbed, principally through the blackened portions of the surface into the reflector. The temperature rises and condensation evaporates.

Figure 8A:
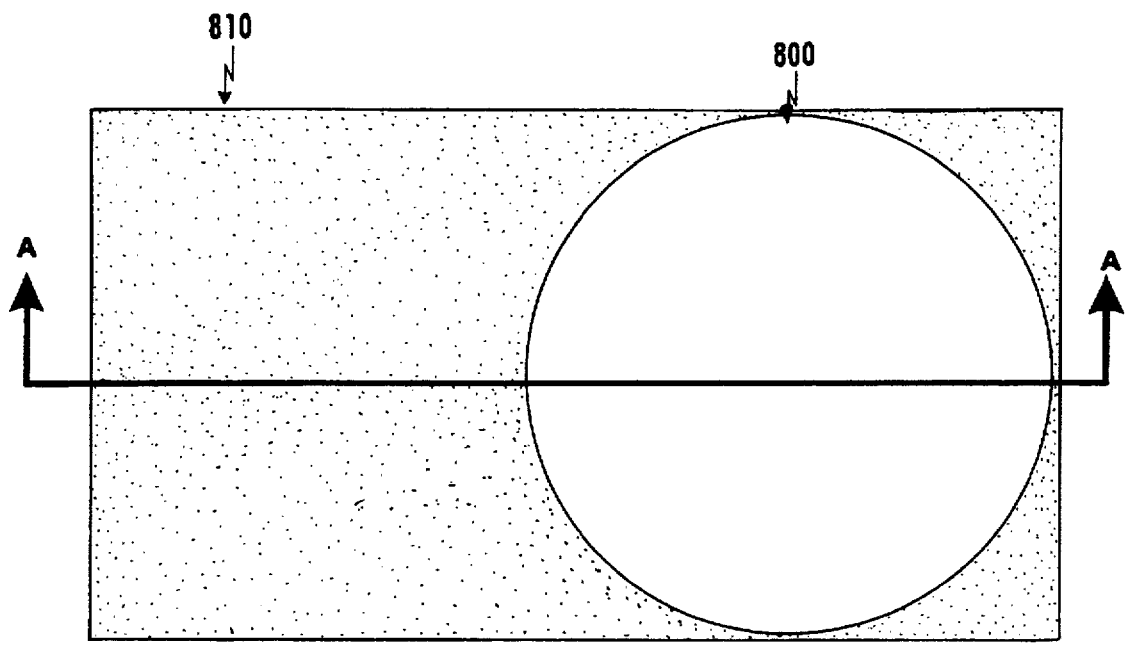
FIG. 8A illustrates a mirror mounted on an oversized sheet of black anodized aluminum.

FIG. 8A illustrates a mirror mounted on an oversized sheet of black anodized aluminum.

Figure 8B:
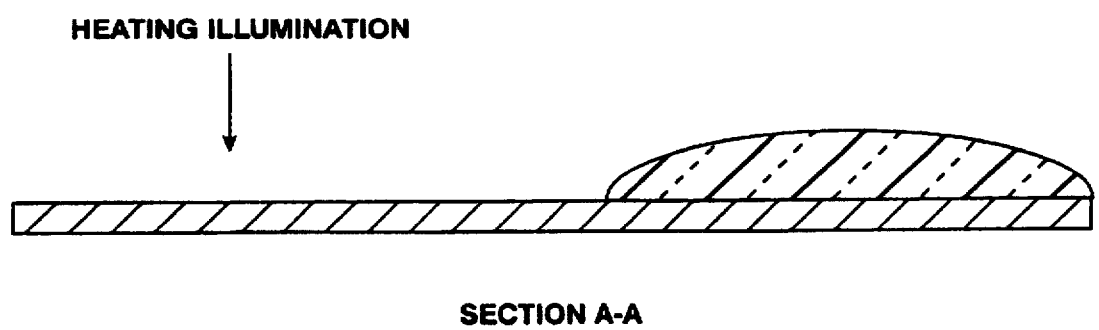
FIG. 8B has a section of the assembly of FIG. 8A taken along section A—A.

FIG. 8B is a section of the assembly of FIG. 8A taken along section A—A. The reflector of FIGS. 8A and 8B utilizes a mirror 800 mounted on a sheet of black anodized aluminum 810. In operation, the exposed portion of the black anodized aluminum sheet is illuminated with the laser beam and absorbs radiation from the beam. Heat from the laser beam propagates throughout the black anodized aluminum sheet and warms the mirror 800 until condensation is disbursed.

Figure 9:
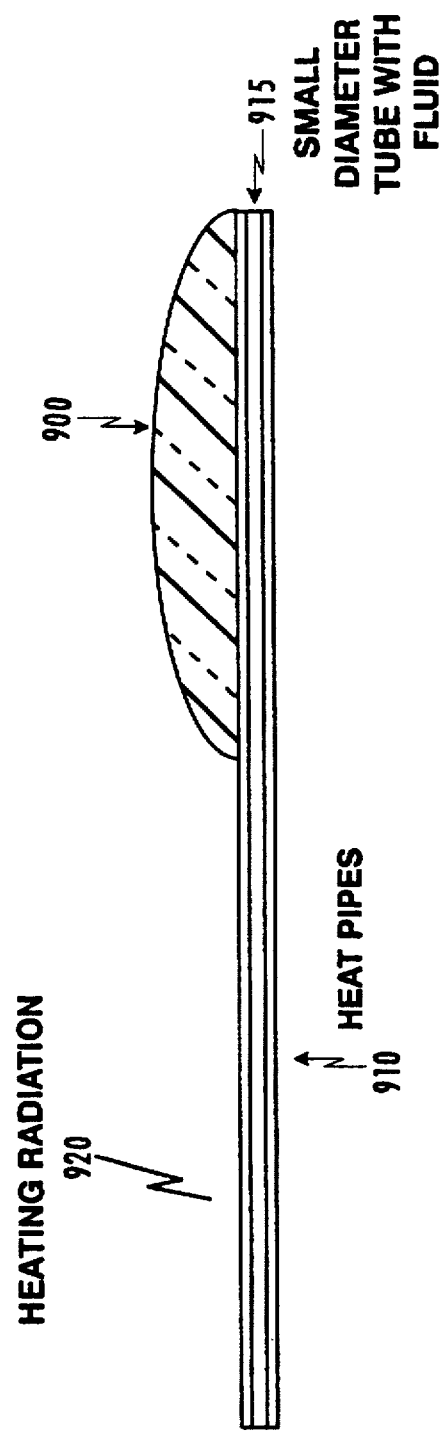
FIG. 9 illustrates a mirror mounted on a section of heat pipes.

FIG. 9 illustrates a mirror mounted on a section of heat pipes. Mirror 900 is mounted on an array of heat pipes, 910, arranged in a flat surface. Heat pipes are very small diameter tubes which are sealed with a low boiling point liquid contained therein. In FIG. 9, when heating radiation 920 impinges upon the heat pipes, the heat pipes absorb energy causing the fluid within the heat pipe to vaporize and propagate down the tubes to areas underneath mirror 900. The vaporized fluid, because of the coolness of the mirror 900 condenses transferring heat to mirror 900 and raising its temperature in the process. Once the vapor condenses back to a liquid, it flows down the heat pipe to the end where the heating radiation is present and the vaporizing-condensing-flowing cycle repeats until the temperature of the mirror is raised to the point that condensation no longer occurs. Once the mirror is sufficiently warmed by the heat pipe process, condensation on the reflective surface will be driven off by the heating.

Figure 10:
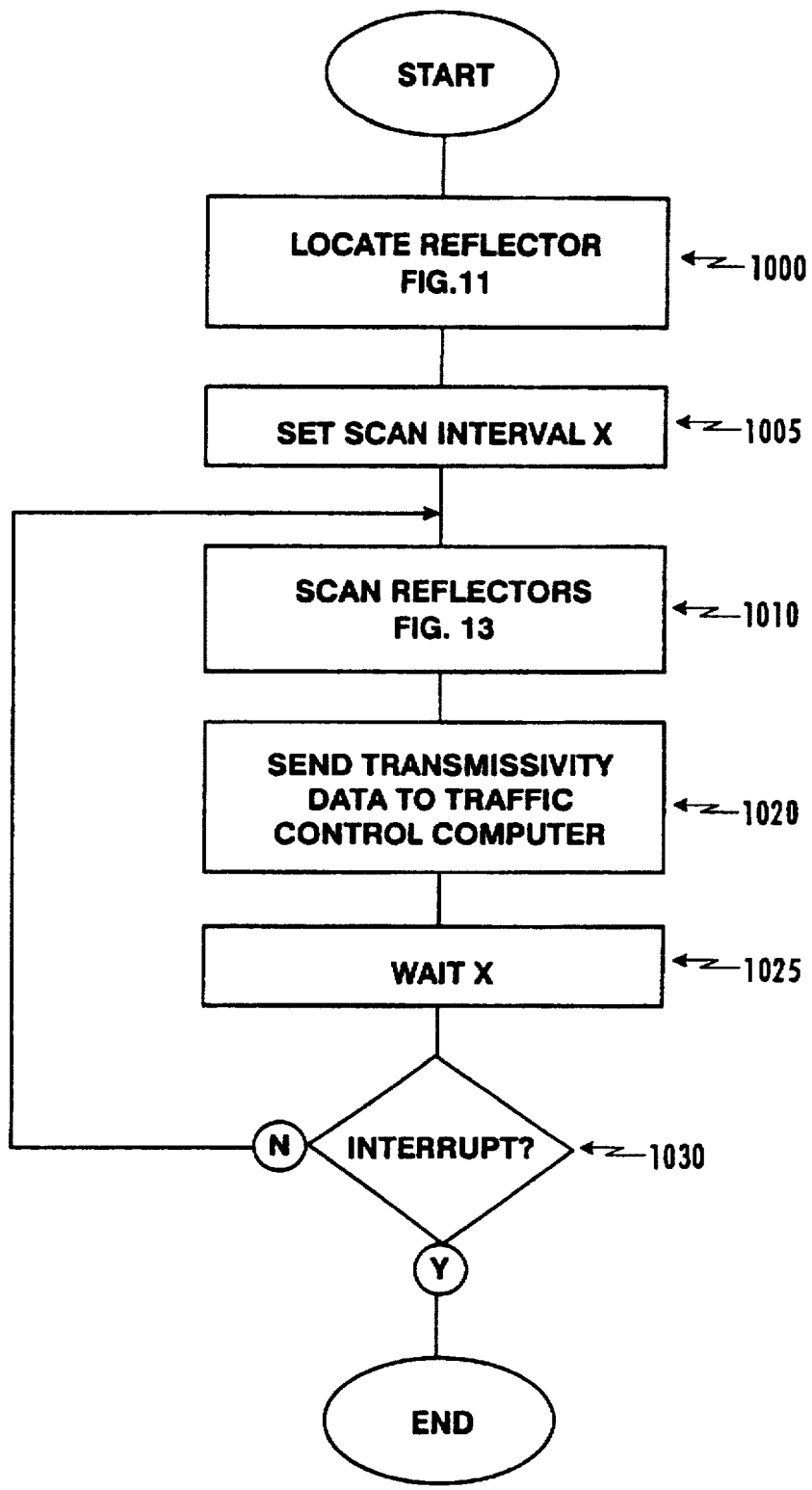
FIG. 10 is a high level flow chart of software utilized to control the scanning transmissometer of the invention and to handle data detected by the transmissometer.

FIG. 10 is a high level flow chart of software utilized to control the scanning transmissometer of the invention and to handle data detected by the transmissometer. Block 1000 represents a locate reflector's subroutine described more detail in FIG. 11. Block 1010 represents a subroutine to scan reflectors more particularly described in FIG. 13.

In operation, at a high level, the scanning transmissometer stores azimuth and elevation coordinates (1000) for each reflector within its view window of the highway. A desired scan interval is set (1005). Once the position of all of the reflectors is known, the reflectors are scanned (1010) to collect data and the collected data is forwarded to a traffic control computer (1020) where the information is used to update information on road conditions. The process of scanning and sending collected data is an ongoing process which operates at intervals which can be set (1005) and adjusted (1025). The process can be selectively interrupted (1030) when desired by an operator.

Figure 11:
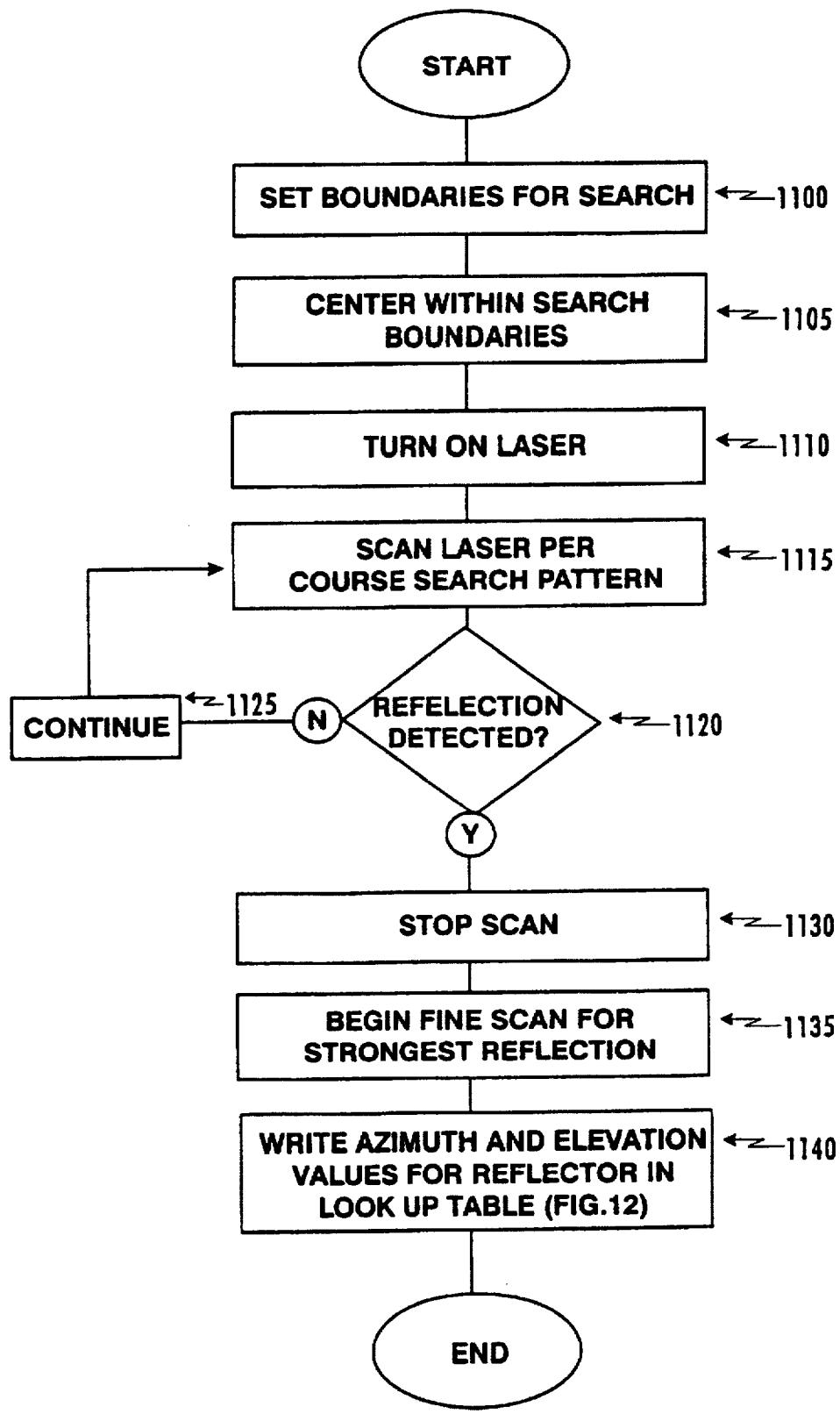
FIG. 11 is a flow chart of a process for locating mirrors used during the set up of the invention.

FIG. 11 is a flow chart of a process for locating mirrors used during the set up of the invention. The purpose of the process illustrated in FIG. 11 is to identify, with considerable precision, the azimuth and elevation for a roadside reflector so that a laser can be properly aimed at the reflector to measure the presence of fog or other causes of reduced visibility. Initially, roadside reflectors are mounted to point toward the scanning reflectometer. However, the scanning reflectometer does not know the azimuth and elevation coordinates for the reflector. At step 1100, azimuthal and elevational boundaries are established for a systematic search for the location of a reflector within those boundaries. A scanning transmissometer is directed to a point at the center of the azimuth and elevational ranges (1105) and the laser is turned on (1110). Scanning of the laser then begins in a coarse deterministic search pattern in an attempt to locate the unknown roadside reflector. One type of course search pattern might be a rectangular spiral pattern in which the laser beam scans only in a straight line and only makes right hand turns. Beginning at the center point, the beam could go left one increment, down one increment, back two increments, up two increments, left 3 increments, down 3 increments, right 4 increments, up 4 increments, left 5 increments, and so forth. When a reflection is detected (1120-Y) the scanning stops (1130) and a fine search begins for the point of strongest reflection in the vicinity of the reflection. When that point is discovered, the azimuth and elevation values for the reflector are stored in a look up table (1140) such as that shown in FIG. 12 and the process ends. If no reflection is detected (1120-N), the coarse scanning pattern continues (1125) until a reflection is detected.

FIG. 12 illustrates a look up table utilized to store information about reflector location and utilized to drive the computerized scanning of reflectors positioned along a highway. In a sample implementation, a look up table containing reflector locations could be arranged with fields for azimuth (1200), elevation (1210), reflector number (1215) and transmissivity (1220). Sample entries are shown for reflectors numbered 1, 2 and 3.

Figure 13:
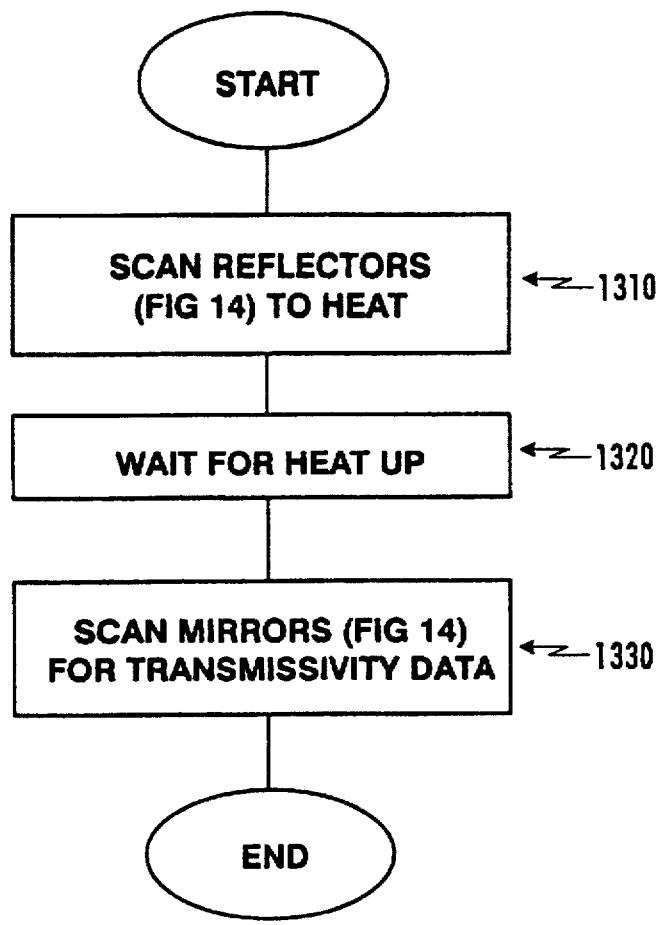
FIG. 13 illustrates a flow chart of a process for warming mirrors prior to measuring transmissivity information.

FIG. 13 illustrates a flow chart of a process for warming mirrors prior to measuring transmissivity information. When scanning reflectors under conditions in which the reflectors may have condensation thereon, the mirrors may be given a prescan to warm the mirrors to the point where condensation will evaporate prior to doing an actual scan (1310). After enough time has passed for condensation to evaporate (1320), the mirrors are scanned again for purposes of collecting data (1330) and the process ends.

Figure 14:
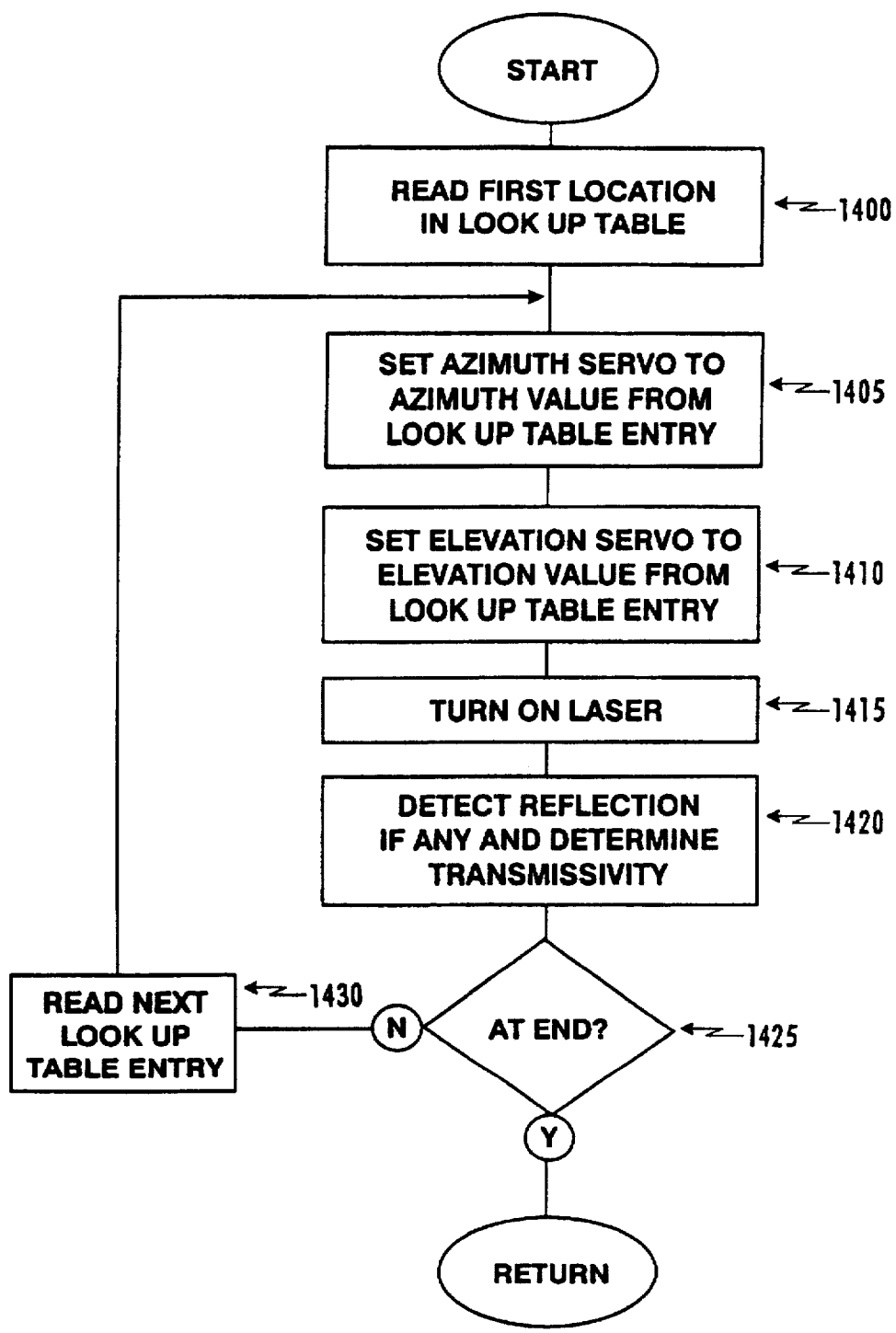
FIG. 14 is a flow chart of a computer program used to measure transmissivity using the scanning transmissometer.

FIG. 14 is a flow chart of a computer program used to measure transmissivity using the scanning transmissometer. The process for scanning reflectors begins with reading a first location in the look up table (1400) such as the look up table shown in FIG. 12. The azimuth information from the table is utilized to set the azimuth servo to an azimuth value from the look up table entry (1405) and elevation data is utilized to set the elevation servo to an elevation value from the look up table entry (1410). The laser is turned on (1415) and the reflector illuminated either for heating or for detecting a reflection to determine transmissivity (1420). The look up table is checked to determine whether the last entry has been read (1425) and if not, the next entry in the look up table is read (1430) and the process loops to the top of block 1405. If the last entry has been read, the process returns.

Figure 15A:
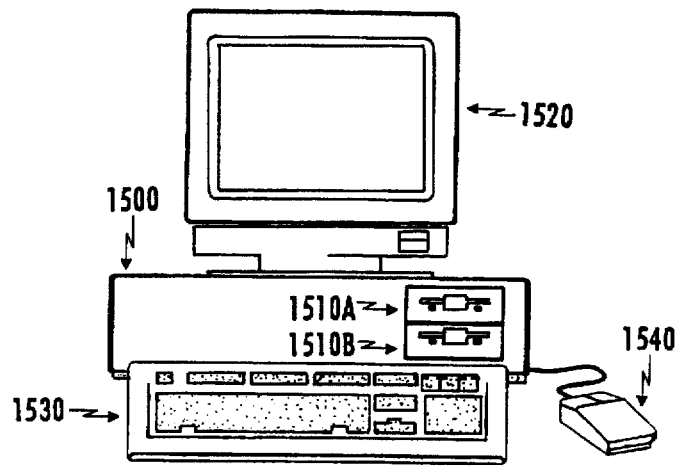
FIG. 15A illustrates a computer of a type suitable for carrying out the invention.

FIG. 15A illustrates a computer of a type suitable for carrying out the invention. Viewed externally in FIG. 15A, a computer system has a central processing unit 1500 having disk drives 1510A and 1510B. Disk drive indications 1510A and 1510B are merely symbolic of a number of disk drives which might be accommodated by the computer system. Typically, these would include a floppy disk drive such as 1510A, a hard disk drive (not shown externally) and a CD ROM drive indicated by slot 1510B. The number and type of drives varies, typically, with different computer configurations. The computer has the display 1520 upon which information is displayed. A keyboard 1530 and a mouse 1540 are typically also available as input devices over interface 1545. Preferably, the computer illustrated in FIG. 15A is a SPARC workstation from Sun Microsystems, Inc.

Figure 15B:
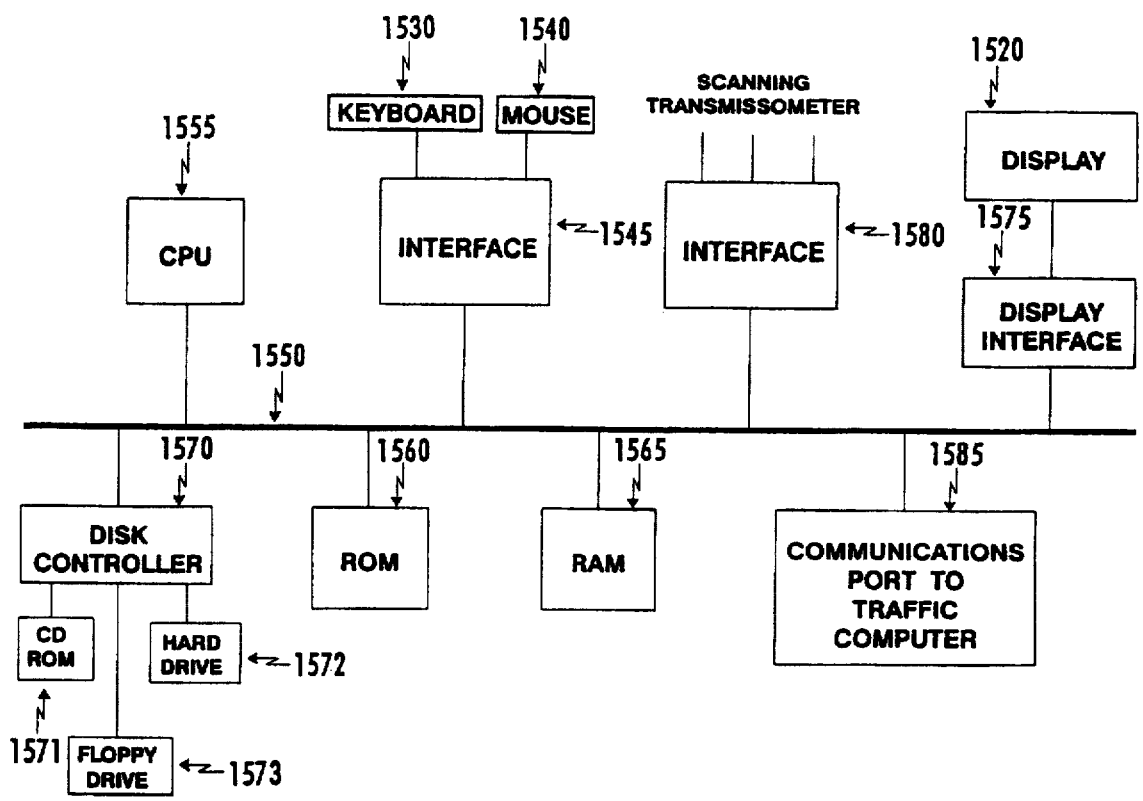
FIG. 15B illustrates a block diagram of the computer of FIG. 15A.

FIG. 15B illustrates a block diagram of the internal hardware of the computer of FIG. 15A. A bus 1550 serves as the main information highway interconnecting the other components of the computer. CPU 1555 is the central processing unit of the system, performing calculations and logic operations required to execute a program. Read only memory (1560) and random access memory (1565) constitute the main memory of the computer. Disk controller 1570 interfaces one or more disk drives to the system bus 1550. These disk drives may be floppy disk drives, such as 1573, internal or external hard drives, such as 1572 or CD ROM or DVD (Digital Video Disks) drives such as 1571. A display interface 1575 interfaces display 1520 and permits information from the bus to be displayed on the display. Information from scanning transmissometers is received over interface 1580 and made available over the system bus to the CPU for processing. Information controlling the scanning of a scanning transmissometer is also sent from the CPU over interface 1580. Information about road conditions identified during scanning by scanning transmissometers or received from low power radio transmitter monitor with or near the reflectors is sent to a central traffic computer such as computer 230 of FIG. 2, over communications port 1585.

Figure 15C:
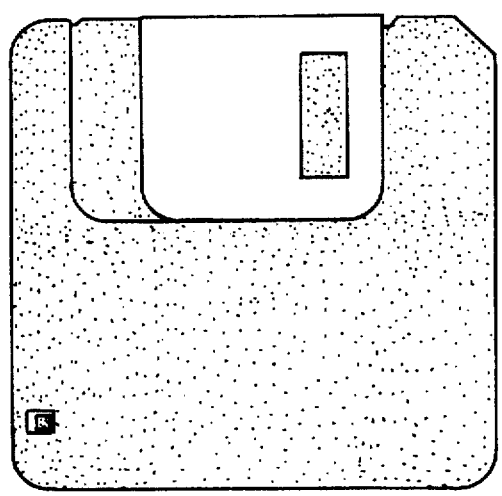
FIG. 15C illustrates a floppy disk containing a program usable with the computer of FIG. 15A.

FIG. 15C illustrates a floppy disk which can be used with floppy disk drives such as 273 in FIG. 15B or 1510A in FIG. 15A. Typically, memory media such as a floppy disk, or a CD ROM, or a Digital Video Disk will contain the program information for controlling the computer to enable the computer to perform its traffic control functions in accordance with the invention.

Thus, using the techniques of the invention disclosed herein, dense, but extremely localized occurrences of fog can be identified reliably in a way which is both cost efficient and which facilitates providing timely and accurate warnings to drivers about road conditions. Problems with condensation on reflectors utilized for detecting fog are eliminated by the techniques disclosed for heating the reflecting components.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. A system for detecting a reduction in visibility comprising:
   a. a plurality of reflectors;
   b. at least one scanning transmissometer for illuminating said reflectors and detecting reflected illumination in which at least one scanning transmissometer is positioned on each side of a roadway and each transmissometer illuminates a set of reflectors on the opposite side of the roadway.

2. The system of claim 1 in which at least some reflectors of a set of reflectors positioned on one side of a highway are positioned intermediate reflectors from a set of reflectors on an opposite side of the roadway.

3. The system of claim 2 in which at least two scanning transmissometers are positioned on one side of a roadway and at least one scanning transmissometer is positioned on an opposite side of the roadway, and in which at least one reflector illuminated by one scanning transmissometer is positioned intermediate reflectors illuminated by a different scanning reflectometer positioned on the same side of the roadway.

4. The system of claim 3 in which reflectors positioned on said same side of the roadway are positioned intermediate reflectors positioned on the other side of the roadway.

5. A system for detecting a reduction in visibility comprising:
   a. a plurality of reflectors;
   b. at least one scanning transmissometer for illuminating said reflectors and detecting reflected illumination in which at least one of said reflectors has a mirror with a surface partially blackened, whereby the blackened portion of said mirror can be used to absorb radiation for heating said mirror.

6. A system for detecting a reduction in visibility comprising:
   a. a plurality of reflectors;
   b. at least one scanning transmissometer for illuminating said reflectors and detecting reflected illumination in which at least one of said reflectors has a mirror mounted on an oversize sheet of blackened metal whereby the portion of said sheet not obscured by said mirror can be used to absorb radiation for heating said mirror.

7. A system for detecting a reduction in visibility comprising:
   a. a plurality of reflectors;
   b. at least one scanning transmissometer for illuminating said reflectors and detecting reflected illumination in which at least one of said reflectors has a mirror mounted on an oversized section of heat pipes whereby the portion of said section not obscured by said mirror can be used to absorb radiation for heating said mirror.

8. A system for detecting a reduction in visibility comprising:
   a. a plurality of reflectors;
   b. at least one scanning transmissometer for illuminating said reflectors and detecting reflected illumination in which at least one of said reflectors comprises a mirror, a heating element, a timer and a laser detector configured so that when the laser detector detects a laser beam, the timer is activated to apply power to the heating element for heating the mirror to help remove condensation.

9. A method of removing condensation from a mirror used with a scanning transmissometer, comprising the step of:

providing an element for performing a step of prescanning said mirror with radiation for heating before using the mirror for scanning measurements.

10. A method of removing condensation from a mirror used with a scanning transmissometer, comprising the step of:

providing an element for performing a step of prescanning said mirror with radiation;

providing an element for performing a step of detecting said radiation and activating a heating element for a duration sufficient for substantially dispelling condensation; and providing an element for performing a step of scanning said mirror with said transmissometer for transmissivity measurements.

11. In a system for detecting a reduction in visibility having a plurality of reflectors and a scanning transmissometer for illuminating said reflectors and detecting reflected illumination, a method of determining the precise location of reflectors, comprising the steps of:

a. determining boundaries beyond which a search for a reflector should not go;

b. directing said transmissometer to the center of the search boundaries;

c. activating the transmissometer;

d. scanning the transmissometer in both azimuth and elevation directions to follow a search pattern; and e. stopping the scanning when a reflection is detected.

12. The method of claim 11, further comprising the step of:

f. initiating a fine scan in the immediate vicinity of the location at which scanning stopped to locate the azimuth and elevation of the transmissometer which results in the strongest reflection.

13. The method of claim 12 in which the azimuth and elevation are written to a look up table.

14. The method of claim 11 in which the azimuth and elevation at which scanning stops is written to a look up table.

15. A method of scanning reflectors with a scanning transmissometer, comprising the steps of:

providing an element for performing a step of prescanning said reflectors with radiation to cause heating; and providing an element for performing a step of scanning said reflectors to measure transmissivity.

16. A method of scanning reflectors with a scanning transmissometer, comprising the steps of:

a. providing an element for storing at least azimuth and elevation values for each reflector in a look up table;

b. providing an element for reading one entry of said look up table;

c. providing an element for controlling said scanning transmissometer to point to the azimuth and elevation values from said entry; and d. performing the steps of reading and controlling for subsequent entries in said look up table.

17. A computer program product comprising a memory medium containing a computer program for scanning of reflectors with a scanning transmissometer by:

a. storing at least azimuth and elevation values for each reflector in a look up table;

b. reading one entry of said look up table;

c. controlling said scanning transmissometer to point to the azimuth and elevation values from said entry;

d. performing the steps of reading and controlling for subsequent entries in said look up table.

18. A method of aligning reflectors for use with a scanning transmissometer comprising the steps of:

a. providing an element for performing the step of controlling alignment servos to position a reflector in response to a remote signal; and b. providing an element for performing the step of detecting the intensity of light from said transmissometer reflected by said reflector and generating said remote signal to control the position of said reflector to seek an increased intensity of light.

19. A computer program product comprising a computer readable memory medium with a computer program thereon carrying out a method comprising the steps of:

a. controlling alignment servos to position a reflector in response to a remote signal; and b. detecting the intensity of light from said transmissometer reflected by said reflector and generating said remote signal to control the position of said reflector to seek an increased intensity of light.

20. A method of aligning reflectors for use with a scanning transmissometer, comprising the steps of:

a. providing an element for performing the step of controlling the transmissometer to scan an area near a reflector until a reflection is acquired; and b. providing an element for performing the step of sending control signals to a receiver connected to alignment servos of said reflector to control the position of said reflector to seek an increased intensity of reflected light at said scanning transmissometer.

21. The method of claim 19 in which said receiver is connected to the alignment servos only while alignment is ongoing.

22. A computer program product comprising a computer readable memory medium with a computer program thereon for:

a. controlling a transmissometer to scan an area near a reflector until a reflection is acquired; and b. sending control signals to a receiver connected to alignment servos of said reflector to control the position of said reflector to seek an increased intensity of reflected light at said scanning transmissometer.

* * * * *